United States Patent [19]
Walker et al.

[11] Patent Number: 5,150,957
[45] Date of Patent: Sep. 29, 1992

[54] REAL TIME REGISTRATION WEAVE CORRECTION SYSTEM

[76] Inventors: David L. Walker, 731 Puma Canyon La., Glendora, Calif. 91740; Steven A. Spears, 1569 Calle Ciervos, San Dimas, Calif. 91773

[21] Appl. No.: 502,472

[22] Filed: Mar. 30, 1990

[30] Foreign Application Priority Data

Oct. 20, 1989 [GB] United Kingdom ............ 8923654.1

[51] Int. Cl.$^5$ ............................................. H04N 3/36
[52] U.S. Cl. .................... 358/347; 358/214; 358/216
[58] Field of Search .............. 358/214, 345–348, 358/54, 215, 216; 369/97

[56] References Cited

U.S. PATENT DOCUMENTS

| | | |
|---|---|---|
| 2,188,679 | 1/1940 | Dovaston et al. . |
| 2,301,374 | 11/1942 | Cox . |
| 2,499,181 | 2/1950 | Downes et al. . |
| 2,628,277 | 2/1953 | Spencer . |
| 2,628,279 | 2/1953 | Roe . |
| 2,651,674 | 9/1953 | Theile . |
| 2,720,554 | 10/1955 | Harshbarger . |
| 2,736,761 | 2/1956 | Sziklai et al. . |
| 2,804,498 | 8/1957 | Theile . |
| 2,810,782 | 10/1957 | Hester . |
| 2,851,519 | 9/1958 | Schira, Jr. . |
| 2,851,521 | 9/1958 | Clapp . |
| 2,890,277 | 6/1959 | Duke . |
| 2,890,278 | 6/1959 | Seur et al. . |
| 2,901,530 | 8/1959 | Artzt . |
| 2,922,841 | 1/1960 | Graziano . |
| 2,952,737 | 9/1960 | Friess . |
| 3,017,462 | 1/1962 | Clark et al. . |
| 3,221,337 | 11/1965 | Quinn et al. . |
| 3,234,326 | 2/1966 | Goldmark et al. . |
| 3,475,549 | 10/1969 | Goldmark et al. . |
| 3,517,118 | 6/1970 | Herman et al. . |
| 3,571,503 | 3/1971 | McMann, Jr. . |
| 3,584,147 | 6/1971 | Flory et al. . |
| 3,584,148 | 6/1971 | Flory . |
| 3,584,149 | 6/1971 | Flory . |
| 3,585,293 | 6/1971 | Crowder . |
| 3,604,850 | 9/1971 | Echenbrecht et al. . |
| 3,609,228 | 9/1971 | Goldmark et al. . |
| 3,780,222 | 12/1973 | Pickstock et al. . |
| 3,809,806 | 5/1974 | Walker et al. . |
| 3,856,987 | 12/1974 | McMann et al. . |
| 4,031,550 | 6/1977 | Wick et al. . |
| 4,104,680 | 8/1978 | Holland . |
| 4,823,204 | 4/1989 | Holland ............................ 358/347 |

FOREIGN PATENT DOCUMENTS

| | | |
|---|---|---|
| 1412128 | 10/1975 | United Kingdom . |
| 1431798 | 4/1976 | United Kingdom . |
| 1431799 | 4/1976 | United Kingdom . |
| 1431800 | 4/1976 | United Kingdom . |
| 2145899 | 4/1985 | United Kingdom . |
| 2213020 | 2/1989 | United Kingdom . |

Primary Examiner—Robert L. Richardson
Attorney, Agent, or Firm—Gregory B. Wood

[57] ABSTRACT

A weave correction system for the transfer of film to video or video to film operable in real time is disclosed. The digital real time registration weave correction system includes: a high powered deflection system and low inductance yoke in conjunction with a cathode ray tube (CRT), and digital circuitry operable to detect the crossing of a light beam generated by the CRT over the edge of a film sprocket hole. The digital real time registration weave correction system is operable in conjunction with a standard telecine. An analog real time registration weave correction system is also disclosed.

17 Claims, 8 Drawing Sheets

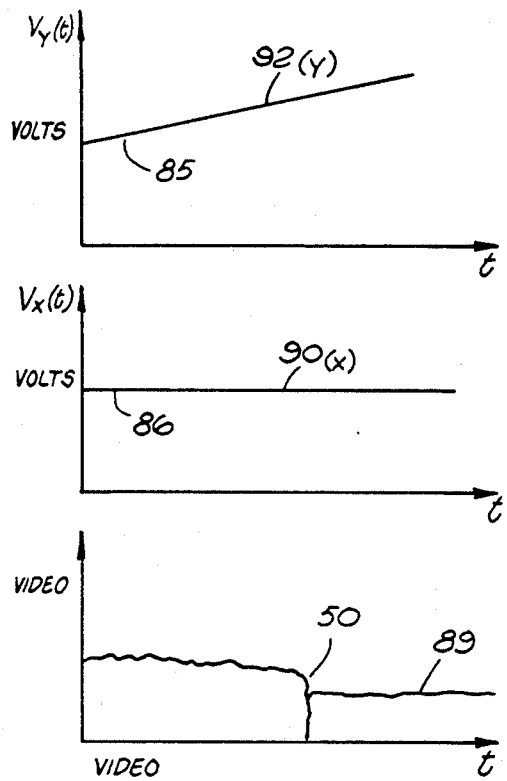
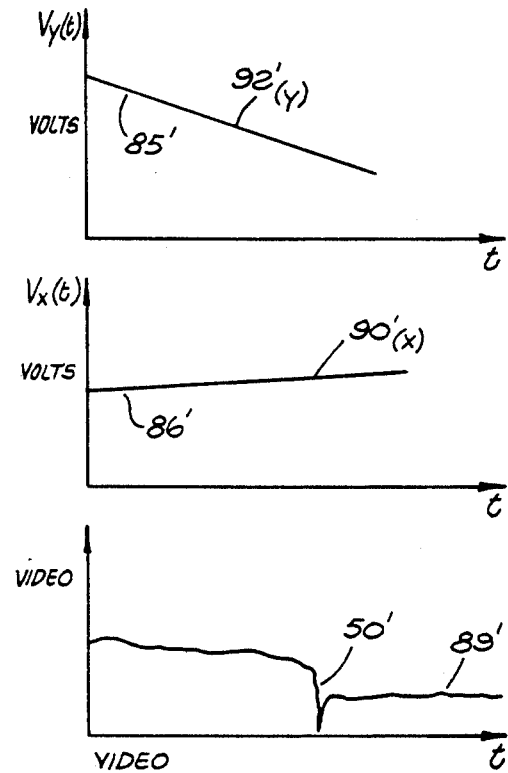
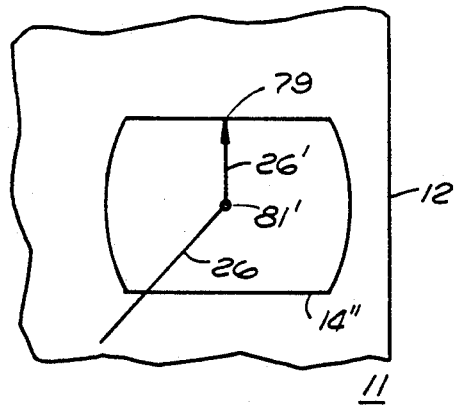
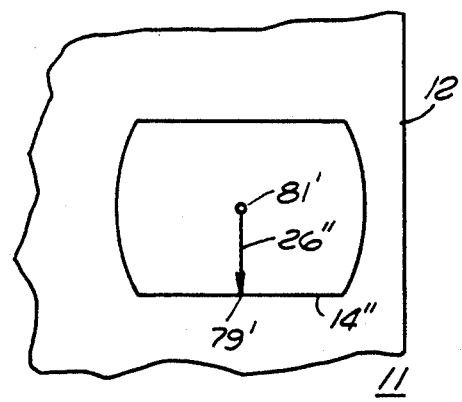
FIG. 3D                    FIG. 3E

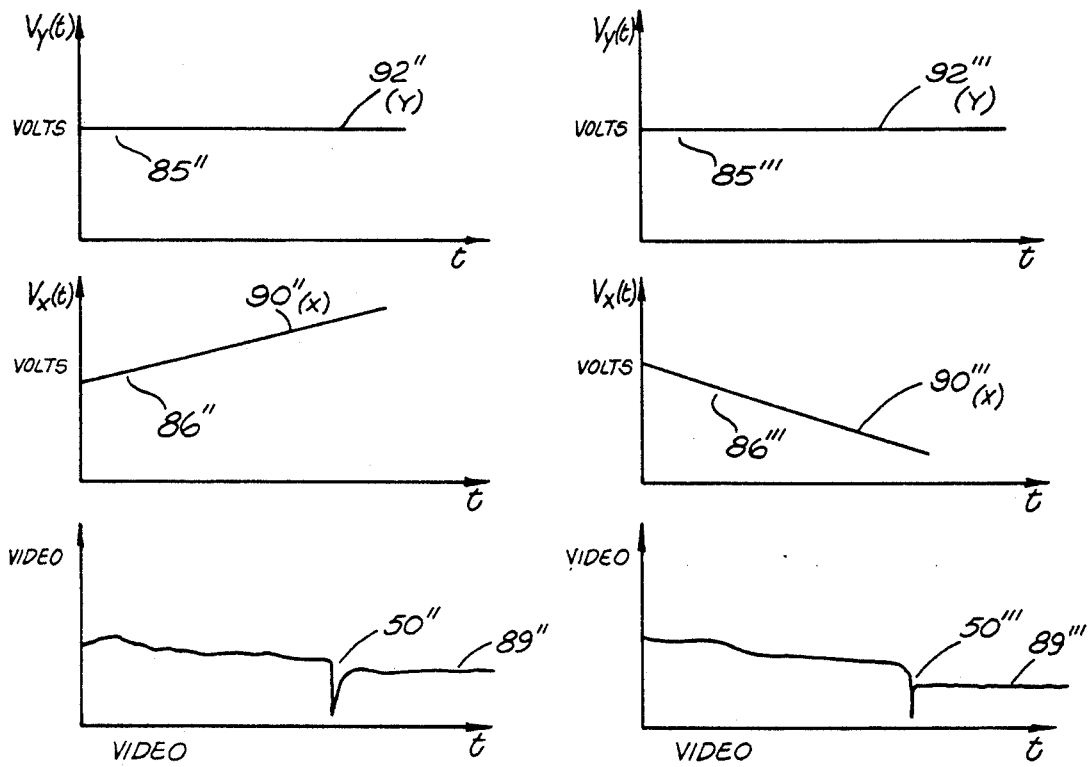
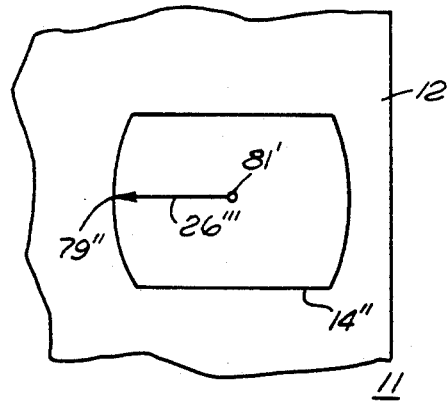
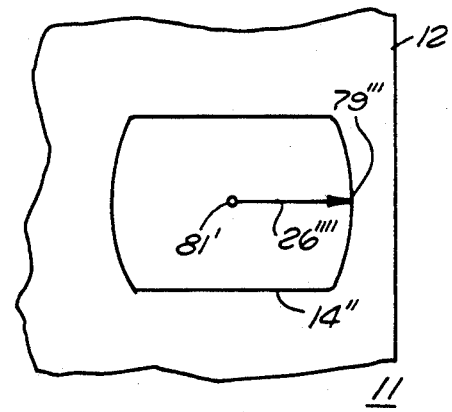
FIG. 3F  FIG. 3G

REAL TIME REGISTRATION WEAVE CORRECTION SYSTEM

BACKGROUND OF THE INVENTION

The present invention relates to a weave correction system and more particularly to a weave correction system which calculates positional error of a strip of film utilizing anticipated and actual sprocket hole position to register the area being scanned.

Weave correction systems have been fabricated.

British Patent No. 1 412 128 published Oct. 29, 1975 for inventor G. M. Fletcher et al. entitled "Improvements Relating To Telecine Machines", discloses a telecine machine adapted to scan film. The Fletcher et al. telecine machine provides an unblanked video television signal, includes a means to receive the unblanked signal, and a means adapted to detect therefrom film frame edges to generate an output signal. This output signal can be used to correct for errors caused by inaccurate alignment of the film in the camera where error is caused by the misregistration between the negative stock and the print stock due either to mechanical deficiencies in the printer or to differential shrinkage between the two stocks.

In the patent issued to Fletcher, the output signal is compared with a source of field or line frequency pulses and the result of that comparison is applied to this telecine machine to displace the scanning rasters so as to register the raster with the film frames. In the Fletcher patent, the telecine machine does not require the film being corrected to bear any special synchronized markings. A separate optical system as believed required in systems that detect film sprocket holes is not required. The Fletcher system utilizes the rack bars or frame edges between each individual film frame to correct for vertical positional errors caused by camera and printer faults. The Fletcher invention is unaffected by damage to sprocket holes and edit jumps.

This apparatus of the Fletcher et al. patent is also applicable for correction of horizontal movement of the film by detecting the side instead of the top or bottom of the film frame. The horizontal scan can extend over the side edges of the film frame relating the output of an edge detector with line frequency pulses and thereby obtaining representative horizontal positional errors. When detecting horizontal errors, the Fletcher apparatus detects the side of the film frame. When detecting longitudinal or vertical errors, this apparatus conveniently detects the rack bar between the frames.

The Fletcher et al. weave correction system corrects only once a frame for vertical displacement, therefore only correcting for slow moving weave. The Fletcher et al. system does not align the registered film frame to the original registration, the sprocket hole, but rather to the film bar. Further, the Fletcher system does not account for dark film frames which would not easily be differentiated from the film bars. Splices or cuts between film frames affect the film bar placement and would significantly impact the weave correction.

The United Kingdom Patent Application GB 2 213 020 published Feb. 28, 1989 entitled "Correction of Film Instability in Telecine" to inventor Ronald Walter et al., discloses weave correction system using a reference target pattern formed on film. This target pattern is scanned by telecine occupying a predetermined position on the film relative to at least one image frame. The detection of the target pattern and the position to film frame is ascertained and the area scanned by the telecine is adjusted to coincide with the image frame.

This patent to Walter et al., discloses a system wherein electronic and film images which are mixed or superimposed during post-production editing can be corrected for mispositioning of the film frame as caused by irregular sprocket hole pitch, camera, printer or telecine misregistration or velocity errors.

The system as disclosed under GB 2 213 020 utilizes as a registration means a predetermined target pattern printed on the film sprocket hole. In previous weave correction systems, using a sprocket hole had been difficult due to deformed edges of the sprocket hole or sprocket holes clogged with dirt or dust.

The Walter et al. target pattern weave correction method cannot use existing film stock. This system requires specially prepared film stock having reference marks inserted therein to register the film frame.

The U.S. Pat. No. 4,104,680 to David E. Holland, issued Aug. 1, 1978 entitled "Method and Apparatus for Film Weave Correction" discloses a method and apparatus for film weave correction using a moving beam recorder or flying spot scanner wherein the film weave correction apparatus causes the beam to sweep at least once for each frame across a sprocket hole adjacent to the film frame.

A detector behind the film detects the beam recorder crossing the sprocket hole edge and the Holland apparatus compares the time of the edge crossing occurrence with a reference time as driven by the system's horizontal sync pulse.

Based upon this time comparison of the edge crossing versus the reference horizontal pulse, a film weave correction signal is generated. This film weave correction signal is then applied to the horizontal deflection circuitry of the Holland device causing the beam to be shifted in such a manner so that the horizontal position for each scanned frame remains constant with respect to the position of the adjacent sprocket hole rather than with respect to the film edge film guide thereby correcting horizontal film weave.

The apparatus as disclosed in the Holland patent U.S. Pat. No. 4,104,680 in practice does not correct effectively when the sprocket hole is upon a splice, is filled with dust or dirt, or is broken in any way.

The Holland method of weave correction in U.S. Pat. No. 4,104,680 does not correct in the vertical direction. Any change in the size of the raster to accommodate different size film frames detrimentally impact the ability of the system to detect film weave. On film having curved sprocket sides any vertical weave causes an error in the horizontal error obtained.

In U.S. Pat. No. 4,104,680, the manner in which the sprocket hole is scanned from the film frame to the sprocket hole on exposed film could lead to erroneous sprocket hole edge detection.

U.S. Pat. No. 4,823,204 also to David E. Holland, dated Apr. 18, 1989 entitled "Method and Apparatus for Film Weave Correction", discloses a method and apparatus for correction of both horizontal and vertical film weave in connection with a continuous motion moving beam recorder or playback device wherein weave correction is accomplished by scanning the sprocket hole of the film and generating a correction signal to compensate for the film weave. The film weave is corrected by electronic weave correction as opposed to mechanical pin registration.

The weave correction system disclosed in U.S. Pat. No. 4,823,204, scans the sprocket hole in the vertical direction to locate the upper and lower edges of the sprocket hole and then the beam is positioned in the vertical center of the hole for determination of horizontal weave of the film. Then the sprocket hole is scanned in the horizontal direction for determination of the horizontal weave of the film. In a film-to-tape transfer system, the edge position of the sprocket hole is advantageously determined by comparing the actual detected signal with a fast peak detector signal set at 90% of the actual signal level and then provision for setting windows of acceptable weave correction signals, such that if the detected error exceeds the window, the previous weave correction signal which is within the window at the particular time is used.

However, the Holland patent, U.S. Pat. No. 4,823,204 only updates the correction signal once per film frame thereby only correcting for slow moving weave. the problem of fast moving film weave is not addressed by the second patent to Holland.

SUMMARY OF THE INVENTION

The present invention, a real time registration film weave correction system corrects for vertical and horizontal weave in the transfer of film to video and video to film wherein a mechanical pin registration is not used to orient the film.

A method for detecting the position of a sprocket hole in a film recording or reproducing apparatus which employs continuous motion film drive includes causing the scanning beam to scan the sprocket hole in a vertical direction to detect a vertical edge to the sprocket hole, and positioning the scanning beam within the sprocket hole based on the detection of a vertical edge and causing the scanning beam to scan the sprocket hole in a horizonal direction.

A real time registration weave correction system is disclosed incorporating; a telecine in conjunction with a high powered deflection system and low inductance yoke surrounding the cathode ray tube operable to rapidly deflect the cathode ray tube beam and weave correction circuitry operable to generate a weave correction signal based upon the difference in position between the anticipated position of a sprocket hole and the actual position of the sprocket hole in the film being transferred.

A real time registration digital weave correction system is disclosed.

A real time registration analog system is also disclosed.

BRIEF DESCRIPTION OF THE DRAWINGS

A complete understanding of the present invention and of the above advantages may be gained from a consideration of the following description of the preferred embodiments taken in conjunction with the accompanying drawings in which:

FIG. 3D is a schematic representation of a beam of light crossing the sprocket hole top interior edge and resultant change in video output signal due to beam diffraction;

FIG. 3E is a schematic representation of a beam of light crossing the sprocket hole bottom interior edge and resultant change in video output signal due to beam diffraction;

FIG. 3F is a schematic representation of a beam of light crossing the sprocket hole left interior edge and resultant change in video output signal due to beam diffraction;

FIG. 3G is a schematic representation of a beam of light crossing the sprocket hole right interior edge and resultant change in video output signal due to beam diffraction;

DETAILED DESCRIPTION OF THE PREFERRED EMBODIMENT

Figure 1:
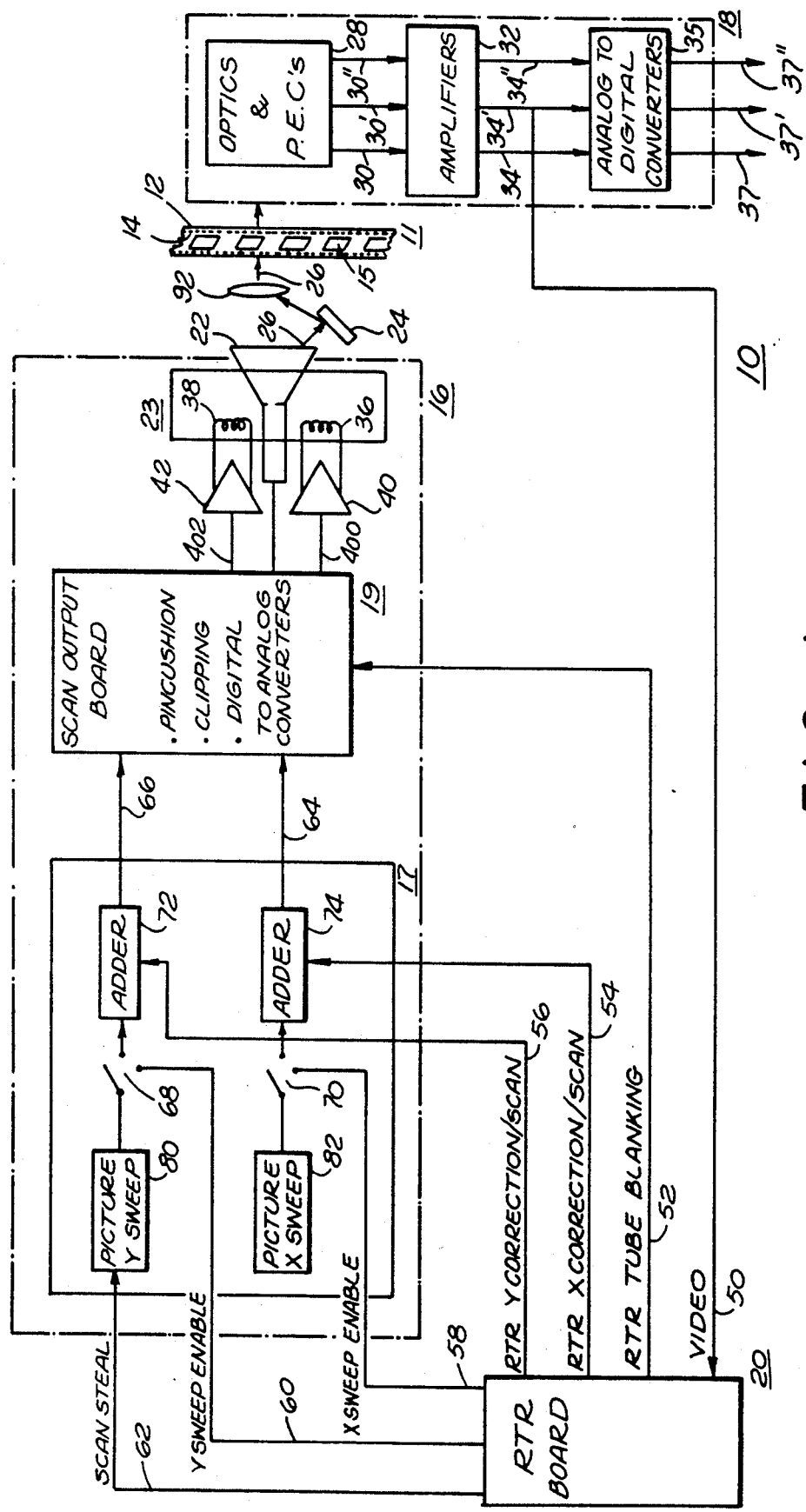
FIG. 1. is a schematic representation of the digital real time registration film weave correction system.

The invention, a real time registration system which is operable to correct the weave in the image transferred from film to video consists of; a standard telecine machine, which has a high powered deflection system and a low inductance yoke capable of random x-y positioning on the cathode ray tube, and appropriate correction circuitry such that a beam of light emitted from the cathode ray tube is operable to scan the film frame and can be stopped within the film frame scanned.

The beam can be redirected to an area inside the sprocket hole, and then further directed to find the interior edges of the sprocket hole. After the interior edges of the sprocket hole have been found their position is used to compare the position of the sprocket hole as it is found versus a known predicted sprocket hole position. The real time registration system is then operable to generate a correction signal based upon this difference between anticipated and actual sprocket hole positions. The correction signal redirects, using the amplifiers of the high powered deflection system and low impedance yoke of the CRT, the raster to a correct position on the film frame thereby correcting for the film weave. Thus as the sprocket holes move as detected by their interior edges, so does the picture raster.

The real time registration analog or digital weave correction system scans the top edge of a sprocket hole and does a bounds check to see if the deflection value sampled is reasonable. Next the bottom edge of the sprocket hole is scanned and is bounded. The sprocket size is computed using the prior two measurements. This sprocket size for a particular film used has been previously sampled and saved. This size is used to qualify the top and bottom scans as a qualifier and this qualification is used to eliminate momentary picture jumps caused by dirt and noise and from film splices. The top and bottom deflection values are used to generate a vertical correction signal. The vertical correction value is added to the nominal vertical position of the horizontal weave scan. This is necessary because on some film, the right and left sides of the sprocket holes are curved or elliptical in format. If the vertical correction is not used, the horizontal scan would end on different points on the curved sprocket edge thus causing a horizontal error that varies with the vertical weave. The horizontal deflection value is qualified by comparing it with an allowable upper and lower range.

Finally, the horizontal and vertical correction is averaged with previous correction signals insuring that no abrupt changes in the scan video are caused by noise or worn out sprocket holes. Once the positional error is calculated it is subtracted from the previous value of error. The difference between the current error and the previous error is outputted incrementally to further reduce the possibility of an abrupt change to the normal scans that may be noticeable on the normal video as a discontinuity in the picture. This incremental error is evenly distributed between weave scans and is updated at the rate of once per line of the normal raster.

FIG. 1 is a schematic representation of the digital real time registration film weave correction system 10 wherein a strip of film 11 having film edge 12 and film sprocket holes 14 comprises a multiplicity of individual film frames 15. The beam generation and beam direction control system 16 of the real time registration film weave correction system 10 comprises an optical detection system 18 which is placed behind the individual film frame 15 and is operable to collect the light beam 26 which passes through the film frame 15 as emitted by the beam generation and beam direction control system 16. A real time registration board 20 contains all of the circuitry operable to redirect the light beam 26 as produced by the beam generation and beam direction control system 16.

As shown in FIG. 1, the beam generation beam direction control system 16 comprises a cathode ray tube (CRT) 22 having a yoke assembly 23 comprising an x axis coil 36 and a y axis coil 38. The cathode ray tube 22 emits the light beam 26 which is directed by a mirror means 24 through a lens 92 to scan the film 11. In the beam generation and beam direction control system 16, the two coils 36 and 38 of the yoke assembly 23 are operable to deflect the light beam 26 in the x and y direction, respectively. Scanning amplifiers 40, 42 for the x axis coil and y axis coil, respectively, receive their deflection signals 400 and 402 from the scan output board 19. This scan output board 19 receives its sweeping signals y sweep 66, and x sweep 64 from the scan generator 17. This scan generator 17 generates the normal picture raster and is disabled during weave correction scans in the weave detection mode.

In the scan generator 17, as shown in FIG. 1, during normal raster scan switch 68 is in the closed position allowing the picture y sweep signal 80 to enter the adder 72. During normal raster scan switch 70 is also in the closed position allowing the picture x sweep signal 82 to enter the adder 74. During normal picture raster the RTR y correction/scan signal 56 contains the y correction error value representing the y positional error. During normal picture raster also, the RTR x correction/scan signal 54 contains the x correction error value, representing the x positional error. The y correction/scan signal 56 is added to the y sweep signal 80 in the adder 72 which shifts the raster for any positional error in the y direction. The x correction/scan signal 54 is added to the x sweep signal 82 in the adder 74 which also shifts the raster for any positional error in the x direction.

As further seen in FIG. 1, as the scanning light beam 26 scans the individual film frames 15, the light beam 26 emitted by the CRT is detected by the optics and the photoelectric cells 28. These optics and cells 28 are operable to detect light intensity changes, thereby detecting light signals and then emitting them as signals in the blue, green or red range 30, 30', 30'', respectively. These detected signals 30, 30', 30'' are amplified by amplifiers 32 and enter the analog to digital converter 35 as signals 34, 34' and 34'' wherein they exit converted from analog to digital values as signals 37, 37' and 37''. These digital signals 37, 37', 37'' feed the remaining video circuitry in the telecine.

The detected video output signal 50, in this example, is taken from the green detected signal 34' before it enters the analog digital converters 35. This detected video signal 50 is the input into the real time registration board, driving the weave correction system by indicating sprocket hole interior edge crossing. The use of the video signal 50 as generated from green amplified signal 34' is exemplary of the preferred embodiment. However, the red amplified signal 34'' and the blue amplified signal 34 though generally containing more noise than the green amplified signal 34', are also operable to provide the video signal 50. Further, a separate photodetector system directed specifically to the sprocket hole 14 and distinct from the photo cells 28 can also be implemented.

The RTR tube blanking signal 52 is operable to stop the scanning of the light beam 26 from the CRT 22 thereby enabling the light beam 26 to be repositioned after blanking. The RTR blanking signal 52 is also operable to lower the intensity of the light beam 26 during sprocket hole 14 scan. Lowering this light intensity is necessary to prevent the video signal 50 from being clipped. If the video signal 50 is clipped it may not be possible to detect the sprocket hole 14 edge. The telecine operator can adjust the gain of the video from the photo electric cells in block 28. The RTR CPU adjusts the blanking level during scans to insure proper video level is available to the video detector 53.

Figure 2:
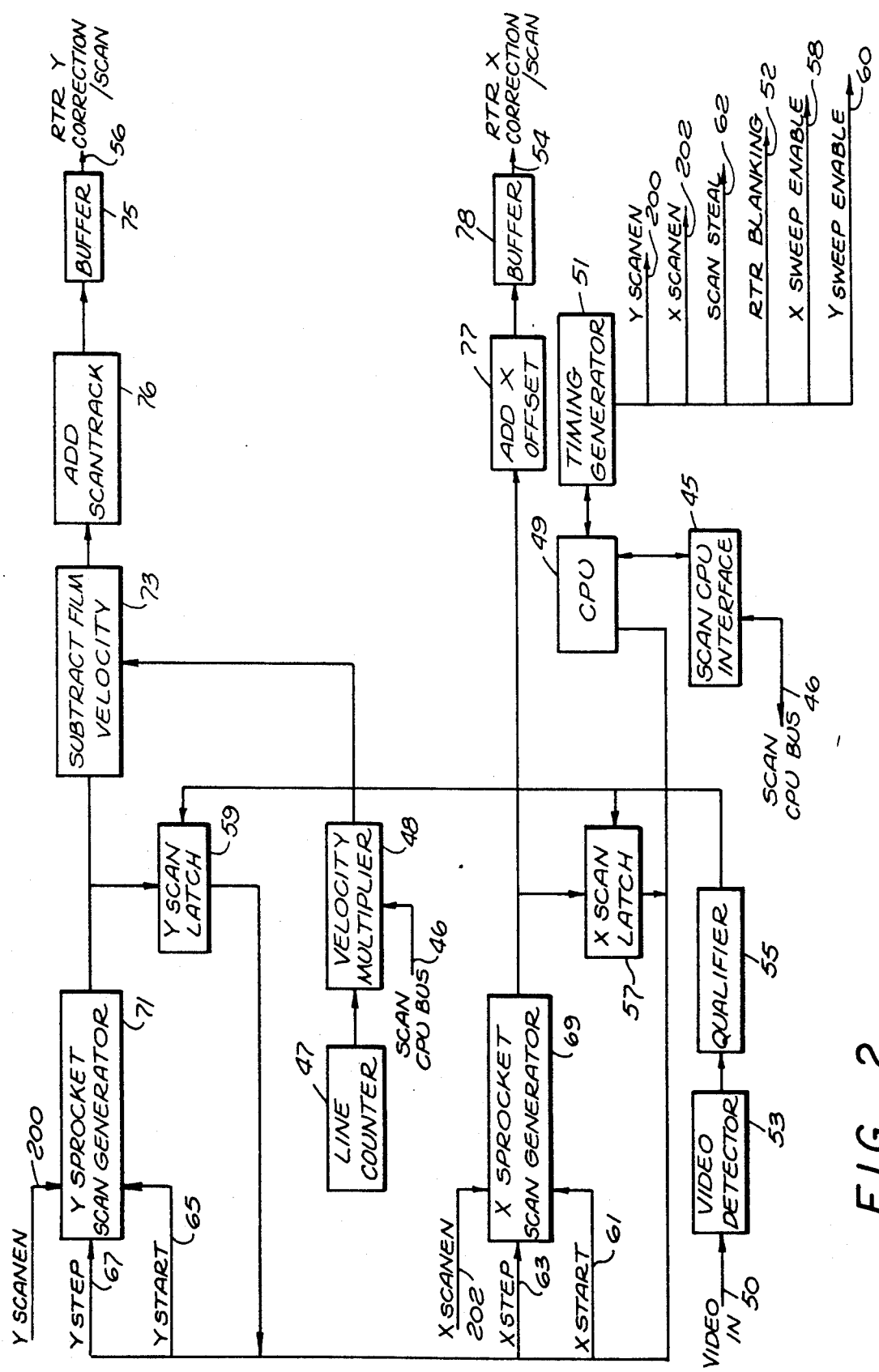
FIG. 2 is a schematic representation of the real time registration board of the digital real time registration film weave correction system.

The scan steal signal 62, y sweep enable signal 60 and x sweep enable signal 58 are also received by the scan generator 17 from the real time registration board 20 and are described in detail in FIG. 2.

FIG. 2 is a schematic representation of the real time registration board 20 of the digital weave correction system 10. On this board 20, the detected video signal 50, derived from the amplified green signal 34' out of the optical receivers 28 positioned behind the film strip 11, is an input to video detector 53. The video detector 53 is a circuit which generates a digital signal when a drop in voltage occurs when the scanning beam detects or crosses the sprocket hole 14 interior edge. The video detector 53 inputs the detected video signal 50 into a qualifier 55 which in turn feeds the signal 50 into the y scan latch 59 and x scan latch 57. Also, as an input to the x scan latch 57 and y scan latch 59 are the output signals coming from the x sprocket scan generator 69 and the y sprocket scan generator 71. These two x and y scan generators 69 and 71, respectively, function as ramp generators such that they are initiated by a start signal YSCANEN 200 for the y sprocket scan generator 71 and XSCANEN 202 for the x sprocket scan generator 69. The scan speed or ramp slope is determined by the number inputted by YSTEP 67 and XSTEP 63. When scanning in the y direction XSTEP is 0, when scanning in the x direction the YSTEP is 0.

As shown in FIG. 2, the y scan latch 59, and x scan latch 57 latch upon the appropriate y and x positions as detected video signal 50 crosses the interior edge of the sprocket hole. The line counter 47, velocity multiplier 48, and velocity adder 73 compensate and remove the effects of film velocity. The add scan track 76 is a normal function of the standard telecine preventing uneven CRT phosphor burn. Buffer 75 which is a latch or register is operable to store the output signal from the add scan track 76 as an output 56 exits the scan generator 17.

The value latched from the scan generator drives a multiplicity of electronic events. Each electronic event has internal delays which hold up the signal. Therefore, the value output from the scan generator is not a true detection of the sprocket edge due to the various sequence delays with the RTR board and the telecine. However, the predictable, non-variable number and nature of the sequence delays within both the RTR board and the telecine can be compensated for through the use of both software and/or hardware.

Correspondingly, the RTR x correction/scan signal from the x sprocket scan generator 69 passes through an add x offset circuit 77 and a buffer 78. The add x offset circuit 77 is a function of the normal telecine. The buffer 78 outputs the RTR correction scan x signal 54 to scan generator 17.

The timing generator 51 shown in FIG. 2 is activated by the CPU 49 to initiate a weave scan. The timing generator 51 activates signals XSCANEN 202, YSCANEN 200, SCANSTEAL 62 and RTR blanking signal 52. Further, the timing generator 51 generates y sweep enable signal 60 and x sweep enable signal 58 which go to the scan generator 17.

The CPU 49 shown in FIG. 2, is the CPU 49 of the real time registration weave correction system 10 and not a CPU of the standard telecine. The CPU 49 receives information from the telecine on a variety of functions such as; if there is film loaded, the type of film that is loaded, and the transport status of the film. The scan CPU interface 45 is a means for the CPU 49 to interface with the telecine scan CPU. The RTR CPU 49 communicates with the telecine scan CPU through the interface 45 to telecine scan CPU bus 46.

The velocity multiplier 48 could be connected to the scan RTR 49 instead of the scan CPU bus 46. This would allow the RTR CPU to correct for velocity errors. If the telecine vertical deflection gain is not properly set there will be an error in the velocity compensation which will cause the video image to have a different size in run compared to the size in stop. The RTR CPU could detect this velocity error and correct for it by comparing the distance between two points on the film in run and in stop and changing the value that is output to the velocity multiplier 48.

Figure 3A:
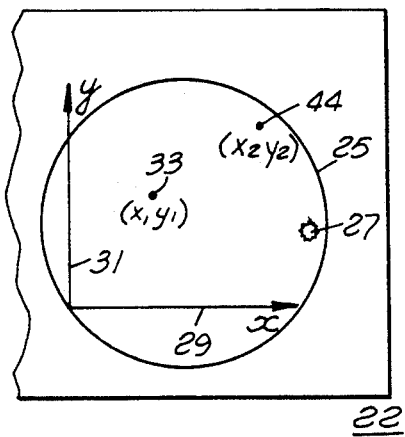
FIG. 3A is a schematic representation front view of a cathode ray tube screen for use in a digital analog real time registration system.

FIG. 3A is a schematic representation front view of a cathode ray tube screen for use in a digital or analog real time registration system. The cathode ray tube 22 comprises a tube having impregnated upon the flattened surface of the glass 25, a thin layer of phosphor which is operable to be excited. When a portion of the phosphor 27 is excited by the electrons within the electrical beam, the screen surface 25 glows. The cathode ray tube 22 with its screen surface 25 can be considered to have areas as can be designated on an x and y axis. X axis 29 and a y axis 31 form a cartesian coordinate plane wherein a specific given coordinate 33 can be designated (x1, y1), This coordinate 33 can be compared to a second referenced coordinate 44 (x2, y2).

Figure 3B:
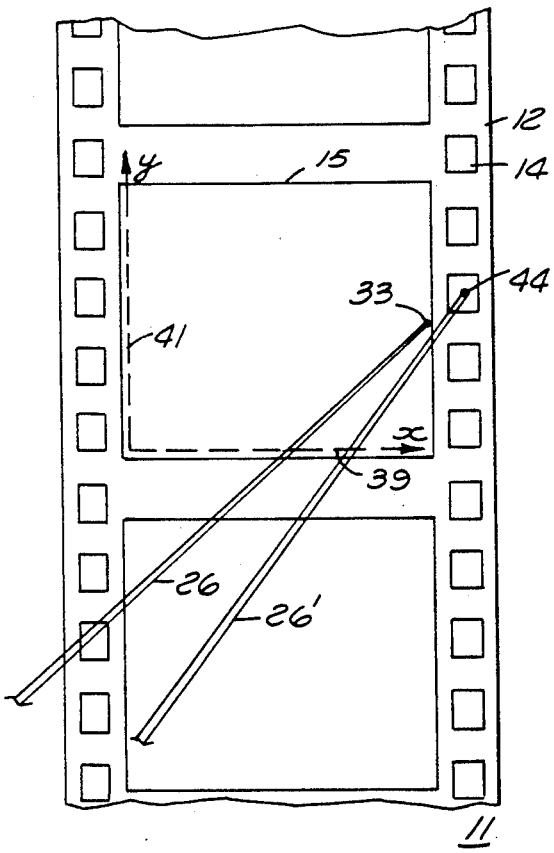
FIG. 3B is a schematic representation front view of a piece of motion picture film.

FIG. 3B is a schematic representation front view of a piece of motion picture film 11. The film 11 has an edge 12 and a multiplicity of sprocket holes 14 formed within close proximity to the edge 12. The sprocket holes 14 with film frame 15 are operable to orient the film 11 in a mechanical registration system but, such a system is inapplicable above very slow speeds for use with the transfer of the film 11 to video in that the sprocket holes 14 would be easily damaged due to excessive start and stop of the film 11. Further, it is not practical to advance the film 15 fast enough without damage if the film 15 is intermittently stopped as in a projector. In this edge guided system of the present invention, each film frame 15 can be seen to be coordinated against an x axis 39 and a y axis 41 wherein the light beam 26 from the cathode ray tube strikes the film frame 15 where photodetectors positioned behind the frame 15 detect the light beam 26 at it passes through the frame 15. In FIG. 3B, we see the light beam 26 from the cathode ray tube repositioned within the frame 15 from reference 33 to a new reference position 44 within the interior of the sprocket hole 14.

The edge 12 due to manufacturing tolerances is not aligned because the film 11 was originally exposed using the sprocket holes 14 as a pin register. The film 15 in a standard telecine is edge guided and that edge 12 is imprecisely cut thereby jeopardizing the positional relationships between the film frame 15 and the film edge 12. This positional imprecision or error results in a horizontal positional error which changes over time and appears as film weave. Vertical film weave is the result of mechanical deficiencies of the film transport system.

Figure 3C:
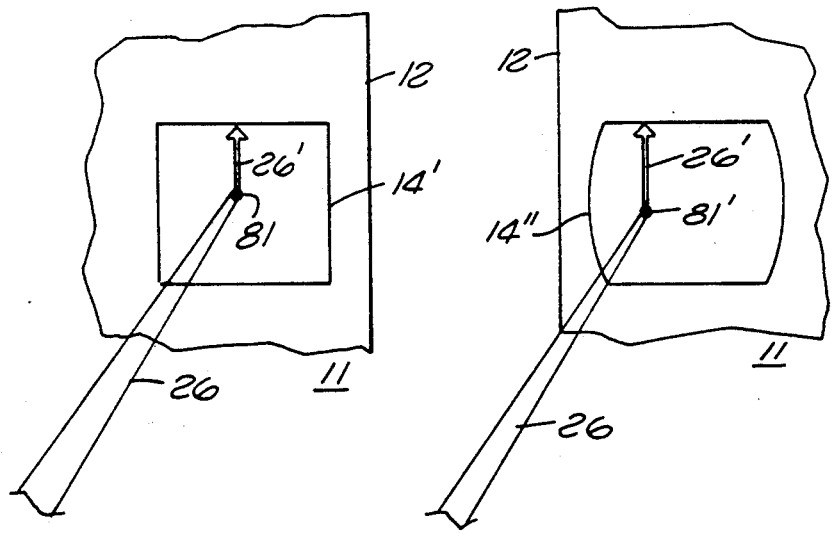
FIG. 3C is a schematic representation of a rectangular and an elliptical sprocket hole.

FIG. 3C is a schematic representation of two distinct sprocket holes 14, 14' one having a rectangular sprocket hole 14' and the other an elliptical sprocket hole 14". The film 11, as shown having edge 12 in both sprocket holes 14' and 14", demonstrate the need for the light beam 26 in the preferred embodiment of this invention to be presented in the direct center of the sprocket hole 14". The light beam 26, can then be directed as shown by directed beam 26' to an interior edge within the sprocket hole 14. This redirected light beam 26' can move up, down or left or right of center 81 just as long as the interior edge is found for the sprocket edge based upon the redirected movement of this light beam 26.

As shown in FIG. 3C in the elliptical sprocket hole 14", a problem occurs with regard to the positioning of the light beam 26 due to the curvature of the edge of the sprocket hole 14". A light beam 26 must be placed in the same vertical position relative to the sprocket hole 14" edge for each horizontal or x correction scan. Preferably, the light beam 26 is directed into the center point 81' of the elliptical sprocket hole 14" in order to achieve the proper edge crossing thereby triggering the correction signal. It is necessary to compensate for vertical weave before scanning in the horizontal direction so that the light beam 26 will always cross the sprocket hole edge 14" in the same place. If this compensation is not performed, the vertical weave will cause the beam to cross on a different position on the curved sprocket 14" edge thus causing a horizontal error based on the uncompensated vertical weave.

FIG. 3D is schematic representation of the light beam 26 crossing of the sprocket hole 14" interior edge 79 and the resultant changes in the video output signal 89 due to diffraction as more clearly shown in FIG. 3C.

As can be seen in FIG. 3D, the film 11 having sprocket hole 14" in this case an elliptical sprocket hole 14" has a light beam 26 disposed to the interior of the sprocket hole to a point 81'. This point 81' within the sprocket hole 14" can occur anywhere within the interior realm of the sprocket hole 14" as long as it does not touch an interior edge 79 of the sprocket hole 14'. Located directly above the film 11 are two voltage signals, Vy(t) 85 and Vx(t) 86, wherein voltage is plotted as a function of time. In this example, a ramp signal for the y coordinate position is shown where y increases incrementally and x component remains fixed. A video signal 89 generated while the sprocket hole interior edge is scanned will evidence a voltage drop and this voltage drop point 50 determines the value of the x and the y coordinates for the exact position of the sprocket hole edge as determined from the video signal voltage drop.

FIG. 3E is a schematic representation of a beam of light crossing the sprocket hole bottom interior edge and resultant change in video output signal due to beam defraction. In this example, the y input voltage signal 85' is shown as a decreasing ramp function Vy(t), while the x input voltage signal 86' remains fixed, Vx(t). When the bottom interior edge 79' of the sprocket 14" is detected by the repositioned light beam 26" the video signal 89' shows a drop in voltage 50' which determines the exact x and y position values 90' and 92', respectively.

FIG. 3F is a schematic representation of a beam of light crossing the sprocket hole left interior edge and resultant change in video output signal due to beam defraction. Next, the y input voltage signal 85" is a fixed function Vy(t), while the x input voltage signal 86" is now an increasing ramp function Vx(t). When the left interior edge 79" of the sprocket 14" is detached by the repositioned light beam 26, the video signal 89" shows a voltage drop 50" which determines the exact x and y position value 90" and 92", respectively.

FIG. 3G is a schematic representation of a beam of light crossing the sprocket hole right interior edge and resultant change in video output signal due to beam defraction. Finally, the y input voltage signal 85'" is a fixed function Vy(t) while the x input voltage signal 86'" is a decreasing ramp function Vx(t). When the right interior edge 79'" of the sprocket 14" is detected by the repositioned light beam 26'", the video signal 89'" shows voltage drop 50'" which determines the x, y position values 90'" and 92'", respectively.

As can be seen from FIGS. 3F and 3G, the function of the video output signal 89 in relation to the x input signal 86 and y input signal 85 wherein the y signal 85 is a ramp function and the x input signal 86 is fixed may be easily reversed wherein the x signal 86 is a ramp function and the y signal 85 is fixed also producing a point 50 when the edge 79 is reached in the left or right interior of the sprocket 14.

The real time registration weave connection CPU can change the ramp slope of the x or y input signals by changing the step size that is output to the sprocket scan generators. Since the ramps are made up of many small incremental steps the accuracy of the position measurement of a sprocket hole edge is limited by the step size. Fine steps allow the position to be more accurately measured but since a smaller portion of the tube is scanned, the sprocket hole can be detected over a small distance. Course steps can cover a large distance at the expense of accuracy.

The real time registration weave correction system overcomes this problem by tracking the sprocket hole 14 as it moves. The start position for the scan is changed depending on previous detected sprocket hole 14 locations. This sprocket hole tracking allows fine scan to be used with great accuracy and over a large range of positional error. Course scans can produce a course position location while fine scans measure the position accurately. In the present embodiment of this invention a course scan is performed once per frame while the scans that generate the correction to the raster are finer and more accurate.

As long as an edge crossing occurs, the start position of scans in the direction scanned is not important. Further, the step size need not be the same for consecutive scans. Further, the ramp function need not necessarily be linear to achieve these results.

Figure 4:
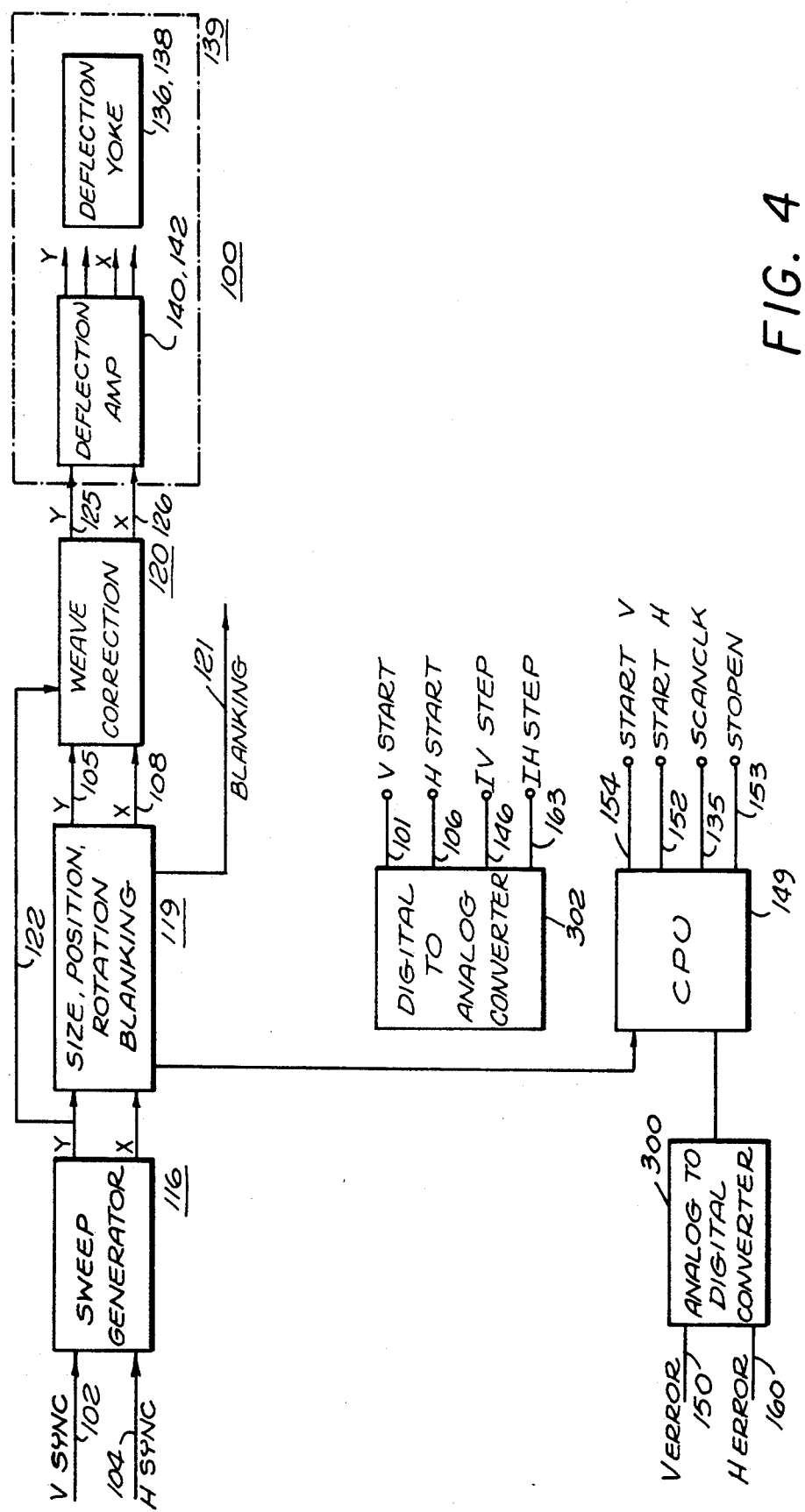
FIG. 4 is a schematic representation of the analog real time registration weave correction system including special effects.

FIG. 4 is a schematic representation of the analog real time registration weave correction system 100 wherein this system the vertical sync pulse 102 and the horizontal sync pulse 104 initiates events into the sweep generator 116. The sweep generator 116 is the scanning means for the normal picture and the special effects block 119 is interconnected to a CPU 149 which initiates the following signals; STARTV 154, STARTH 152, SCANCLK 135 and STOPEN 153.

As shown in the special effects block 119, special effects can be produced using this analog weave correction system 100. These special effects include; changing the size of the picture being scanned when its reproduced to video wherein the size of the horizontal, size of the vertical, the position of the horizontal and the position of the vertical scan are all changed. The frame can be rotated around any angle, the top bottom left and right can be flipped with regard to its position, perspective can be changed wherein the picture is vertically squeezed at the top having angle and depth.

Blanking for the CRT during scan retrace occurs in the blanking system 121. The actual signal correction circuit is the weave corrector 120 operable to produce the weave correction signal based upon the recognition of the edge crossing of the interior edge of the sprocket hole. The output signals in the x direction 126 and the y direction 125 of the weave correction circuit 120, change the position of the light beam with a deflection means 139. This deflection means 139 would require x and y amplifiers 140 and 142, respectively producing the high powered deflection capability necessary to move the light beam rapidly. The deflection amplifiers 140, 142 are directed toward the deflection yoke 136, 138 surrounding the cathode ray tube issuing the beam.

The digital to analog convertor 302 produces many signals, such as VSTART 101, HSTART 106, IVSTEP 146 and IHSTEP 163 that are used by the analog real time registration weave correction system 100.

Figure 5:
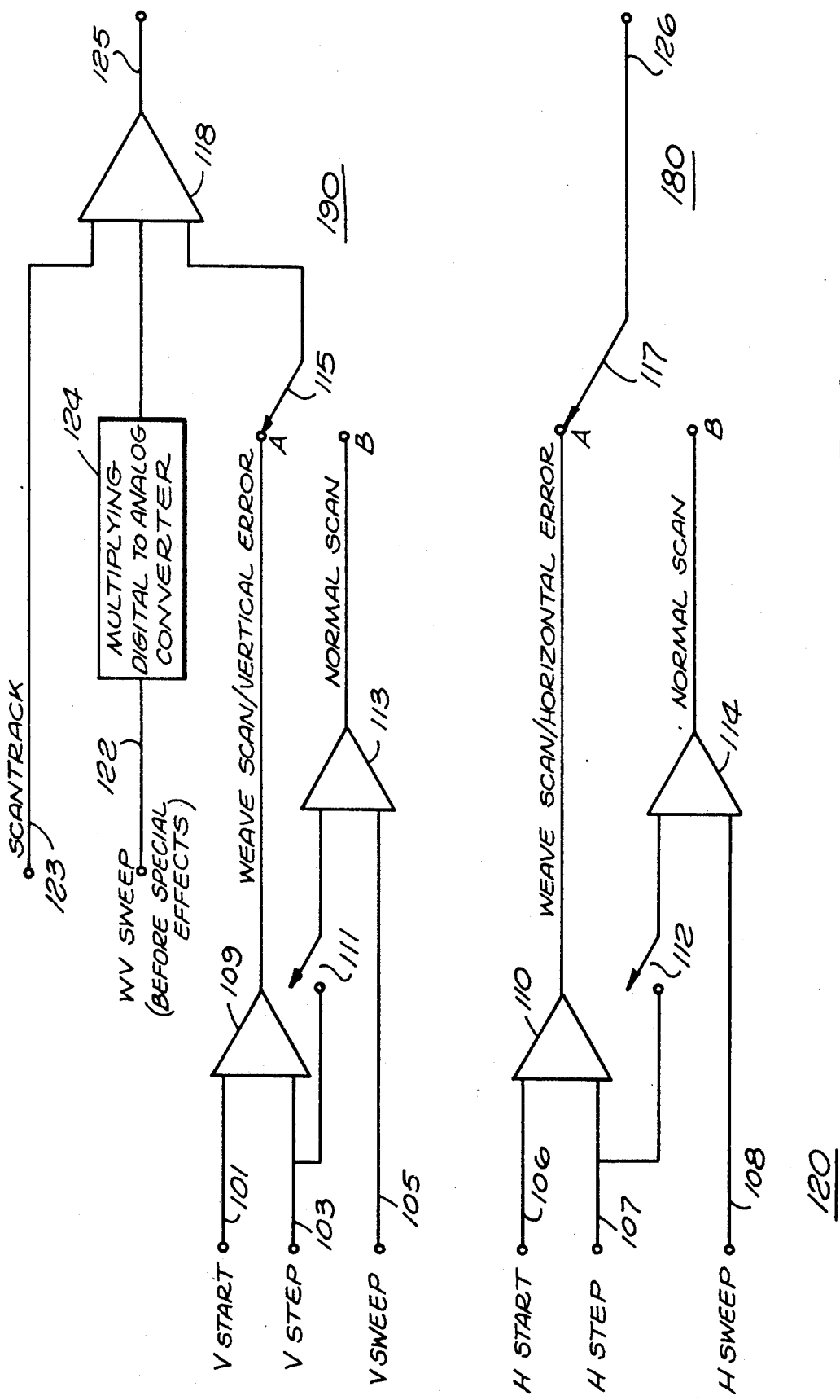
FIG. 5 is a schematic representation of the analog film weave corrector circuit for weave scan and error summing.

FIG. 5, a schematic representation of the analog weave corrective circuit 120 for the weave scan error summing circuit which comprises two distinct circuits. The first circuit 190 produces the vertical output signal 125, and the other circuit 180 the horizontal output circuit signal 126.

A starting signal VSTART 101, and a step signal VSTEP 103 are received from the digital to analog convertor 302 which has put the light beam at the anticipated location of the sprocket hole and add additional scanning to the start position. The step is a ramp signal which scans the small sweep at a particular position and the start signal comes directly from the computer. Both of these signals, VSTART 101 and VSTEP 103 re summed together in a summing amplifier 109 while a sweeping signal VSWEEP 105 is generated by the sweep generator 116 as shown more clearly in FIG. 4. In the circuit 190, where the vertical output signal is calculated two switches are shown. When switch 111 is closed weave error correction is turned on, and switch 112 is closed, These switches either actuate or turn off the weave correction from the vertical and horizontal sweeps respectively.

In the vertical output signal circuit 190, when switch 111 is closed, and switch 115 is in the B position, the VSTEP signal 103 is combined with the VSWEEP signal for a normal scan. This normal scan is an input to the summing amplifier 118 wherein the scan track signal 123 combines with the WVSWEEP signal before special effects 122 and to the multiplying digital to analog convertor 124. The digital to analog convertor 124 is the equivalent of a velocity multiplier. By combining scan track signal 123 to WVSWEEP 122, and the input signal from the normal scan a summed signal 125 through the summing amplifier 118 producing as the vertical v output.

When switch 111 is open and switch 115 is in the A position, the VSTART signal 101 combines with the VSTEP signal 103 and both are directly combined for the weave scan for vertical error through the summing amplifier 109, the multiplying digital to analog convertor 124 and the scan track 123 producing the vertical output signal 125.

Correspondingly, the horizontal output signal 126 is also calculated using start and step signals, HSTART 106 and HSTEP 107, respectively. These signals are summed in summing amplifier 110 and a horizontal sweep signal 108. These signals IHSTEP and HSWEEP 107 and 108 respectively, are combined through summing amp 114 when switch 112 is in the closed position and switch 117 is in the B position. A normal scan of the film frame as horizontal output signal 126 is produced. When switch 117 is in the A position input signals HSTART 106 and HSTEP 107 are combined in summing amplifier 110 to provide a weave scan for horizontal error through switch 117 thereby producing output signal 126.

The scan track 123 circuit shown in the vertical output signal calculation circuit 190, is an existing telecine signal used to slowly add a vertical shift to the run raster so the cathode ray tube be actuated in a large patch of the tube. This prevents burning the screen in a narrow area.

The VSTART 101 is a vertical start signal generated by the digital to analog convertor 302 under the CPU 149 control. The VSTEP 103 is a vertical step generated by the weave scan generator. When doing a vertical scan, it is in a ramp function and at other times it represents the vertical weave error. The VSWEEP 105 is the normal vertical sweep of the scanning light beam for the vertical output signal calculation circuit 190, HSTART 106 is the horizontal start signal generated by the digital to analog convertor under CPU control. IHSTEP 107 is the horizontal sweep signal generated by the weave scan generator and when doing a horizontal weave scan, it is in a ramp function and other times it represents the horizontal weave error. HSWEEP 108 is the normal horizontal sweep.

The weave correction circuit 120, during the normal scan by the light beam, has switch 115 and switch 117 in position B. If weave correction is being implemented both switches 111 and 112 are on. Otherwise switches 111 and 112 are off. Vertical and horizontal weave correction through circuits 190 and 180 can therefore be independently enabled.

As can be shown in FIGS. 4 and 5, when weave correction is enabled the CPU 149 uses the vertical 102 and horizontal sync 104 pulses to determine when to do the sprocket hole scanning. The sprocket hole scanning is done in the inactive, vertical interval just before the normal frame scans become active, thereby generating a clear video picture. Multiple vertical scans are done in average by the CPU.

This vertical error which is the result of mechanical displacement is distinct from horizontal film weave, and must be compensated prior to doing horizontal scan correction. This is necessary to make sure that the y or vertical starting position with respect to the sprocket being scanned is always the same. If vertical correction is not performed, then the vertical weave error would affect the measurement of the horizontal error, particularly for elliptical sprocket holes. After the vertical scanning is performed, multiple horizontal scans are then performed and averaged.

Figure 6:
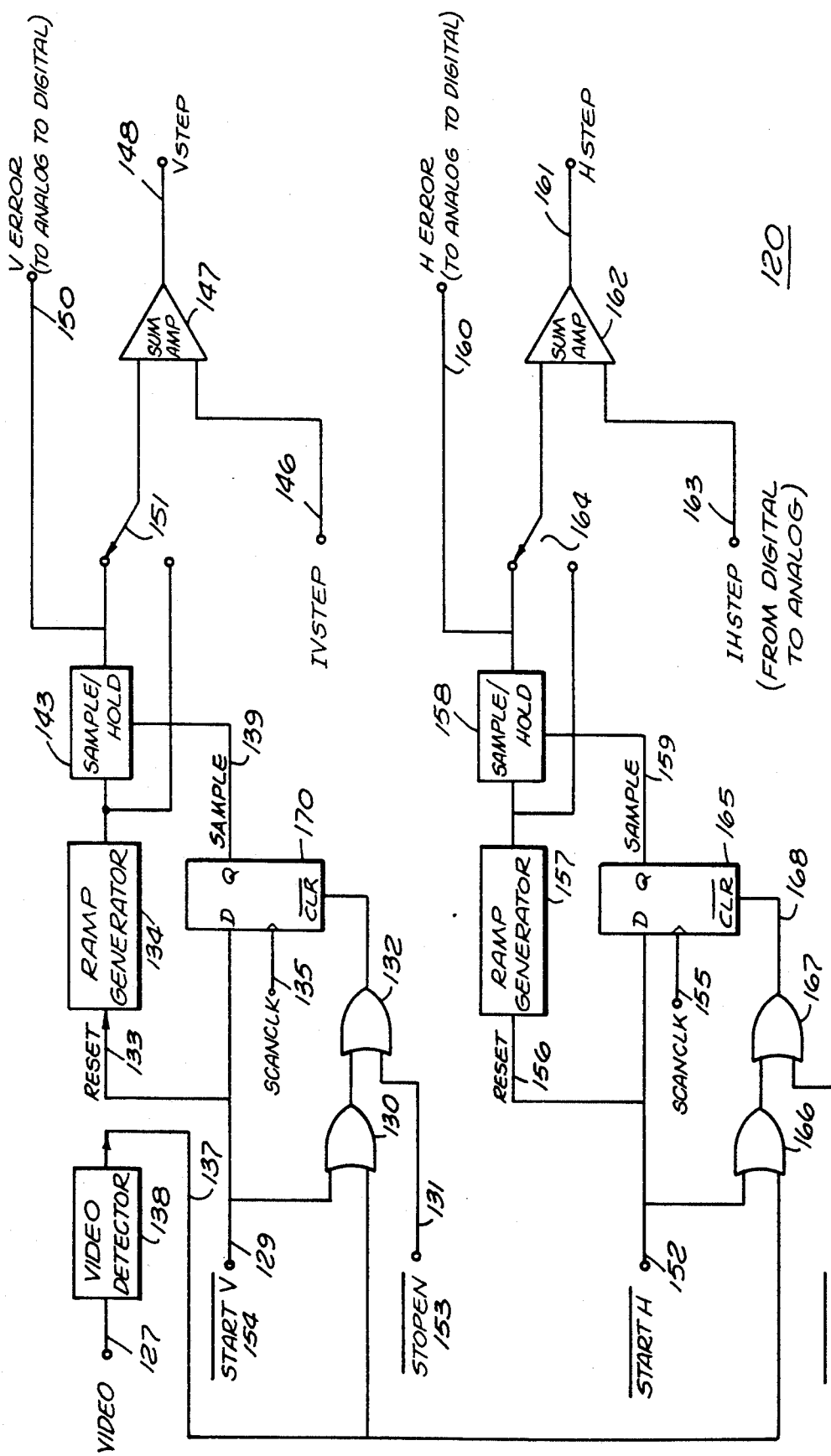
FIG. 6 is a schematic representation of the analog weave corrector circuit for the weave scan generator.

FIG. 6 is a schematic representation of the analog weave correction circuit for the weave scan generator 120. The video input signal 127 comes from the optical detectors of the system 100 and enter a video detector 128 which has a sprocket hole clamp. For a short period of time when the light beam is moving across the sprocket hole, the video level is sampled. This sampled voltage is subtracted from the video signal so that the video detector 138 has a voltage range from zero at the sprocket hole and some nonzero value at the film level. The output signal of the video detector 138 shown as 137 is input to an OR gate 130 which receives a STARVV signal 154 at entry port 129. These two signals STARTV 154 and 137 are then compared. As shown in this FIG. 6, ramp generators 134 and 157 initiate the ramp function when they are not reset. Sample and hold circuits 143 and 158 stop and sample each ramp and hold the values when cleared. Flip-flop circuits 165 and 170 and stopen 153 stop enabling. The IVSTEP 146 has the averaged vertical error correction at the conclusion of the vertical weave scans.

The sampling method of successive approximation can be utilized to find the sprocket hole position. The video is sampled and then successively sampled in increments one-half the distance between the last value sampled and where the next point is found to determine the exact position of the sprocket hole edge as opposed to detecting the edge by the crossover as in the ramp scan format. This same successive approximation method is comparable to analog to digital converter function examining at one-half the distance between two extremes converging on the final location.

The method or process by which the vertical scans are performed for the weave corrective circuit 120 as shown FIG. 6, comprises the following steps: the output VSTART 101 and HSTART 106 is determined for the vertical scan; signals IVSTEP 146 and IHSTEP 153 are zeroed and are so is the accumulated vertical error variable internal to the CPU; switches 115 and 117 are set to position A. The following processes are repeated four times; the CRT is blanked, the vertical ramp sample hold is set with SCANCLK 155 to one, disabling video signal 127 from tripping the ramp sample where STOPEN 153 is set to one. The scan generators are reset with STARTV 154 equal to one and STARTH 152 equal to one. The video clamp sample and hold mode is set to sample, the vertical ramp is started, and the tube is unblanked. There is a delay waiting for the unblanking and the ramp start. Then the video clamp sample and hold mode is set to zero. STOPEN 153 is reset allowing the video detector 138 to sample the vertical ramp when the sprocket hole edge is crossed. The scan ends, the tube is blanked, the ramp is reset, the analog to digital convertor 124 is read and an average is taken of the samples. The average output vertical error to IVSTEP 146 initiates the start of the next function.

Horizontal scans for the analog weave correction system 100 as shown in FIGS. 5 and 6 begin when signal VSTART 101 scans STARTH 152 are output for the horizontal and IHSTEP set to zero. The accumulated horizontal error is zeroed and for four times, the tube is blanked in the horizontal ramp sample and hold sample mode. The scan clock with signal SCANCLK 155 is set to zero. The video signal 127 is disabled to trip ramp sample and hold wherein signal STOPEN 153 is equal to one, the reset scan generators 134 and 157 are implemented for STARTV 101 equivalent to one and STARTH 152 equal to one. When video clamp sample and hold mode SPSAMPLE equals one, a horizontal ramp sample and hold mode wherein the scan clock signal SCANCLK 155 equals one a delay also occurs. The start horizontal ramp occurs when STARTH 152 equals zero. The tube is again unblanked, there is a delay waiting for the unblanking and the ramp start. The video clamp sample and hold mode wherein spsample equals zero occurs, enables video detector 138 to sample the horizontal ramp. There is a time period for the end of the scan, the tube is again blanked, scan clock signal SCANCLK 155 set to zero, the reset ramp has STARTH 152 equal to one. A reading is taken by the analog to digital convertor 300. An average sample is calculated from this readout The output average horizontal error to IHSTEP 163 occurs when the normal sweeps for switch 115 and 117 are set to position B and weave correction occurs when switches 111 and 112 are on.

The real time registration analog or digital system does not use the normal sweeps of the beam from the cathode ray tube to scan the sprocket hole. The real time registration system scans the sprocket hole without regard to any reference in time but rather at the moment the scan crosses the sprocket hole the deflection value of the light beam against the edge is sampled.

In the digital system, the telecine sprocket scan is generated using a digital ramp and a digital latch as the sampler for that ramp. In the analog system the telecine sprocket scan is generated by an analog ramp generator and an analog sample and hold amplifier as the sampler for that ramp.

Because the actual deflection value that caused the edge crossings is directly known, the real time registration system, analog or digital, has no need of a reference time. The real time registration weave correction system directly measures sprocket hole position.

In both analog and digital systems it is necessary that the deflection beam be able to illuminate the sprocket area of the film. It is well known but not shown in these drawings that in a standard telecine this is normally not possible because the hole in the skid plate over which the film passes is not wide enough. The scanning hole in the skid plate must be modified to accommodate the sprocket scanning.

Also, the initial scanning position of the sprocket hole need not be determined empirically. Texts containing standardized tables of film dimension information are available to support the sprocket hole location.

The above described system functions extremely well with standard telecines. The area used for the clamp the video is one that is constant and predictable. The video level inside the sprocket hole is used to clamp onto using the system. Further, the system incorporates vertical correction prior to horizontal correction. The described system would allow the applicability of modifications of the system to incorporate special effects such as the positioning zoom and rotation of the effects.

Unlike other weave correction systems the invention presented here is capable of detecting and correcting the positional error multiple times throughout the normal raster. This continuous sampling is more effective in removing film weave than systems that only update once per film frame. The real time registration weave correction system periodically 'steals' lines from the normal raster. In the present system this is done every 20 lines. The CPU's 49 and 149, as shown in FIGS. 2 and 4, maintain an internal line count, which is used to activate the weave scans. When a weave scan is done the scansteal signal 62 stops the telecine vertical raster counter 80 this is necessary so that when the weave scan is completed the line that would have been scanned on the film will be rescanned. During the weave scan the telecine frame store must be prevented from storing the invalid video. The scansteal signal is used for this purpose. The aperture corrector must also be modified. The vertical counter used to generate the velocity compensation 47 must not be stopped during weave scans. Instead of stealing lines of the raster it is possible to modify the telecine to increase the inactive time between raster lines to allow for weave scanning.

Depending on the quality of the CRT, the amount of zoom used, the CRT beam current and the telecine film speed there may a noticeable line on the video image output by the telecine due to the scan stealing scheme. This line is caused by a phosphor heating effect. When the telecine is in run the raster gets smaller in the vertical direction because the motion of the film is partially responsible for scanning the film. This causes multiple scans to overlap causing a heating effect and thus a diminished light output. When the real time registration weave correction system does a weave scan the phosphor has time to cool thus when the normal scans are resumed the light output and thus the video is slightly brighter This would only be noticeable in telecines that did not have CRT burn correctors. On other telecines this problem can be solved by measuring the light output of the CRT prior to the light passing through the film and changing the gain of the red, green, and blue amplifiers in the telecine to compensate for the difference in light intensity from the CRT. This problem may also be solved by a non sequential scan raster that would reduce the effects of overlapping scans.

It should be noted that the RTR system works in stop as well and in run. Although the film is not moving in stop it may have a positional error do to the deficiencies in the film transport system. The film does not always stop in the same place, and may for example, stop at a different place when stopped from reverse than in forward.

While particular embodiments of the invention have been shown and described, it will be obvious to those skilled in the art that changes and modifications may be made without departing from the invention in its broader aspects and therefore the aim in the appended claims is to cover all such changes and modifications as followed in the true spirit and scope of the invention.

What is claimed:

1. A digital weave correction system operable to correct film weave in the transfer of film to video and video to film, comprising:
   a light beam generating means operable to produce a light beam;
   a reflective means operable to reflect said light beam received from said light beam generation means;
   a focusing means operable to receive said reflected light beam from said reflective means and further operable to focus said reflected light beam to a position on a piece of multi-framed, sprocketed film stock;
   an optical detection means positioned behind said multi-framed sprocketed film stock, operable to detect the changing intensity of said light beam as it passes through said multi-framed sprocketed film stock, further said optical detection means operable to produce a video signal when said focused light beam crosses an interior edge of a sprocket hole in said multi-framed, sprocketed film stock;
   a real time registration means said real time registration means operable to receive said detected video signal from said optical detector means, and said real time registration means operable to generate a vertical and a horizontal correction signal;
   a scan generator means, said scan generator means operable to generate a normal vertical scanning signal and a normal horizontal scanning signal, said scan generator further operable to receive said vertical and said horizontal correction signal from said real time registration means, said scan generator means further operable to combine said normal vertical scan signal with said vertical correction signal and combine said normal horizontal scan signal with said horizontal correction signal; and
   a light beam deflection assembly means said light beam deflection assembly means surrounding said light beam generation means, said light beam deflection assembly means operable to receive said combined vertical scan/correction signal and said combined horizontal scan/correction signal, said light beam deflection assembly means being further operable to deflect said light beam in the horizontal and the vertical directions.

2. A digital weave correction system operable to correct film weave in the transfer of film to video and video to film as in claim 1 wherein said light beam generation means is a cathode ray tube.

3. A digital weave correction system operable to correct film weave in the transfer of film to video and video to film as in claim 1 wherein said focusing means is a lens.

4. A digital weave correction system operable to correct film weave in the transfer of film to video and video to film as in claim 1, wherein said reflective means is a mirror.

5. A digital weave correction system operable to correct film weave in the transfer of film to video and video to film as in claim 1 wherein said light beam deflection assembly is a high powered amplified deflection system using a low inductance yoke.

6. A method of digital weave correction operable to correct film weave in the transfer of film to video and video to film, comprising the steps of:
   producing light beam generating means operable to produce a light beam;
   producing a reflective means operable to reflect said light beam received from said light beam generation means;
   producing a focusing means operable to receive said reflected light beam from said reflective means and further operable to focus said reflected light beam to a position on a piece of multi-framed, sprocketed film stock;
   producing an optical detection means positioned behind said multi-framed sprocketed film stock, operable to detect the changing intensity of said light beam as it passes through said multi-framed sprocketed film stock, further said optical detection means operable to produce a video signal when said focused light beam crosses an interior edge of a sprocket hole in said multi-framed, sprocketed film stock;
   producing a real time registration means said real time registration means operable to receive said detected video signal from said optical detector means, and said real time registration means operable to generate a vertical and a horizontal correction signal;
   producing a scan generator means, said scan generator means operable to generate a normal vertical scanning signal and a normal horizontal scanning signal, said scan generator further operable to receive said vertical and said horizontal correction signal from said real time registration means, said scan generator means further operable to combine said normal vertical scan signal with said vertical correction signal and combine said normal horizontal scan signal with said horizontal correction signal; and
   producing a light beam deflection assembly means said light beam deflection assembly means surrounding said light beam generation means, said light beam deflection assembly means operable to receive said combined vertical scan/correction signal and said combined horizontal scan/correction signal, said light beam deflection assembly means being further operable to deflect said light beam in the horizontal and the vertical directions.

7. A method of film image registration for motion picture film as used on a motion picture film-to-television signal reproduction apparatus said method comprising the steps of:
   (a) scanning a film image said film image mounted upon a strip of motion picture film, with a scanning beam;
   (b) storing said scanned film image in a temporary image storage means;
   (c) interrupting said film image scanning for at least one image scan line of the image scanned;
   (d) disabling said temporary image storage means;
   (e) using said scanning beam during said interruption to locate the instantaneous position of at least one sprocket hole on said motion picture film;
   (f) shifting said film image scanning beam due to the difference in position between said instantaneous position and an anticipated position of said sprocket holes;
   (g) resuming said film image scanning of the unscanned film image areas caused by said interruption; and repeating steps (a) through (g) for each film frame scanned.

8. The method in claim 7 wherein area scanned by said scanning beam changes based on previously detected instantaneous position.

9. The method of claim 7 further comprising the steps of using a secondary temporary image storage means to generate simultaneous adjacent lines of video and for image processing requiring simultaneous adjacent lines of video and disabling the secondary temporary image storage means located prior to said temporary image storage.

10. The method of film image registration for motion picture film as used on a motion picture film-to-television signal reproduction apparatus as in claim 7 wherein determination of said instantaneous position of said sprocket hole further comprises the steps of:
   (a) deflecting said scanning beam across an edge of said sprocket hole by continuously changing a deflection value representing a position on said motion picture film;
   (b) detecting said sprocket hole edge crossing from the change in video output level when said scanning beam crosses said sprocket hole edge;
   (c) determining said deflection value when said scanning beam crosses said sprocket hole edge producing said instantaneous position of said sprocket hole; and
   (d) sampling said deflection value when said sprocket hole edge crossing occurs.

11. A method of determining the instantaneous position of a sprocket hole on motion picture film as used on a motion picture film-to-television signal reproduction apparatus using a scanning beam said method comprising the steps of:
   (a) choosing an approximation location near said sprocket hole on said film;
   (b) positioning said scanning beam at said approximation position;
   (c) determining whether said scanning beam is illuminating said sprocket hole by examining the light intensity detected from said scanning beam;
   (d) changing said approximation position as a result of the determination in step (c);
   (e) preforming steps (b) through (d) a selected number of times to find a last approximation value; and
   (f) using the last approximation value as said instantaneous sprocket hole position.

12. A method of determining the instantaneous position of a sprocket hole on motion picture film as used on a motion picture film-to-television signal reproduction apparatus using a scanning beam, said method comprising the steps of:
   (a) selecting an interior position within said sprocket hole and a film position on said motion picture film;
   (b) selecting an approximation position between said interior position and said film position;
   (c) positioning said scanning beam at said approximation position;
   (d) waiting for said scanning beam to be substantially stationary in a selected direction of scanning beam movement;
   (e) examining the light intensity detected from said scanning beam and determination therefrom whether said scanning beam is illuminating said sprocket hole or illuminating said motion picture film;
   (f) setting said film position equal to said approximation position if said scanning beam is determined to be illuminating said motion picture film and setting said interior position equal to said approximation position if said scanning beam is determined to be illuminating said sprocket hole;
   (g) preforming steps (b) through (f) a selected number of times to define a last approximate position; and
   (h) using said last approximation position as said instantaneous position.

13. A method of determining the positional error of motion picture film having sprocket holes as used on a motion picture film-to-television signal reproduction apparatus using a scanning beam, said method comprising the steps of:
   (a) deflecting said scanning beam across an edge of said sprocket hole by repetitively changing a deflection value representing a position on said motion picture film;
   (b) detecting the change in video output level when said scanning beam crosses said sprocket hole edge to determine said sprocket hole edge crossing;
   c) sampling said deflection value when said sprocket hole edge crossing occurs; and
   d) subtracting an anticipated sprocket hole position value form the sprocket hole position represented by said sampled deflection value, said positional error being a function of said subtraction.

14. Apparatus for processing a vertical deflection signal to compensate for the substantially constant velocity of motion picture film on a motion picture film to video apparatus or a video to motion picture transfer apparatus, said apparatus comprising:
   (a) vertical ramp generation mans for generating a linear ramp;
   (b) velocity value selection means for selecting a value proportional to said substantially constant film velocity;
   (c) velocity multiplier means having as one input the output of said vertical ramp generation means and having as a second input the output of said velocity value selection mans, said velocity multiplier means operable to modify said vertical ramp as a function of the output of said velocity value selection means;
   (d) vertical adder means having as one input the output of said velocity multiplier means and having as a second input said vertical deflection signal, said vertical adder means operable to combine said vertical deflection signal and the output of said velocity multiplier means to generate a film velocity compensated vertical deflection signal.

15. The apparatus of claim 14 wherein said velocity value selection means comprises:
   (a) first distance determination means for measuring a vertical distance between two horizontal sprocket hole edges when said motion picture film is stationary;
   (b) second distance determination mans for measuring a vertical distance between said two horizontal sprocket hole edges when said motion picture film is moving at said substantially constant velocity;
   (c) comparitor means having as one input the output of said first distance determination means and having as a second input the output of said second distance determination means, said comparitor means operable to generate a size difference; and (d) means for generating a velocity value as a function of said size difference.

16. A method of qualifying pairs of sprocket hole edge position measurements representing positions of two different sprocket hole edges on motion picture film in a film registration system which uses sprocket holes to effect image registration, said method comprising the steps of:
- (a) computing the distance between said pair of sprocket hole edge locations;
- (b) computing a size error by comparing said distance with a predetermined expected distance, said predetermined expected distance corresponding to the expected distance between said pair of sprocket hole edges; and
- (c) discarding at least one sprocket hole edge position measurement of said pair of sprocket hole edge position measurements if said size error is greater than a predetermined amount.

17. A method of scanning a sprocket hole in a digital motion picture film registration system which uses a scanning beam and sprocket holes to effect registration, comprising the steps of:
- (a) scanning said sprocket hole edge by causing said scanning beam to move incrementially in course steps to locate a course sprocket hole location; and
- (b) scanning said sprocket hole edge by causing said scanning beam to move incrementially in fine steps to locate a fine sprocket hole location wherein area scanned by said fine scanning is a function of said course sprocket hole location.

* * * * *